Oct. 25, 1960 — K. ZWICK ET AL — 2,957,392
MACHINE TOOLS
Filed Aug. 30, 1956 — 2 Sheets-Sheet 1
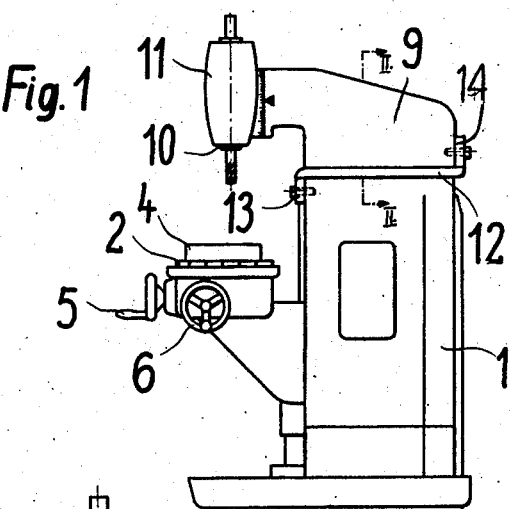
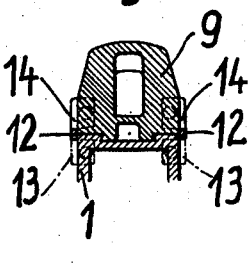
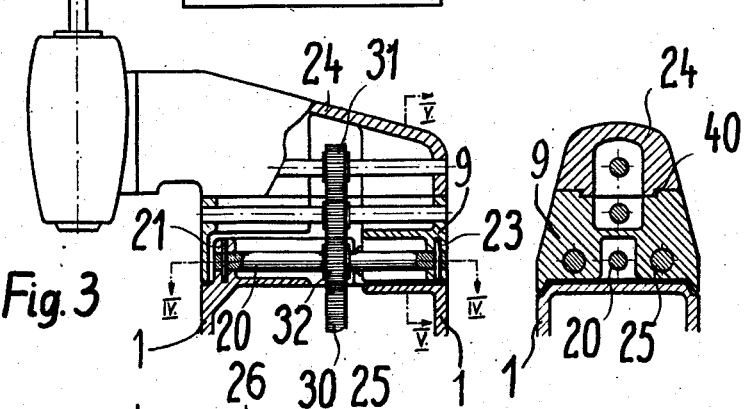
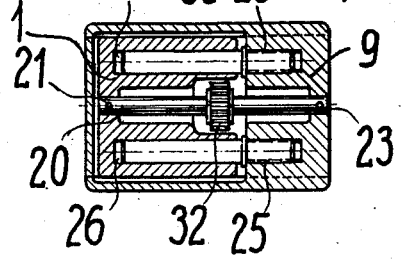
INVENTORS
KURT ZWICK
RUDOLF WOLFBAUER
John Q. Brady
ATTORNEY

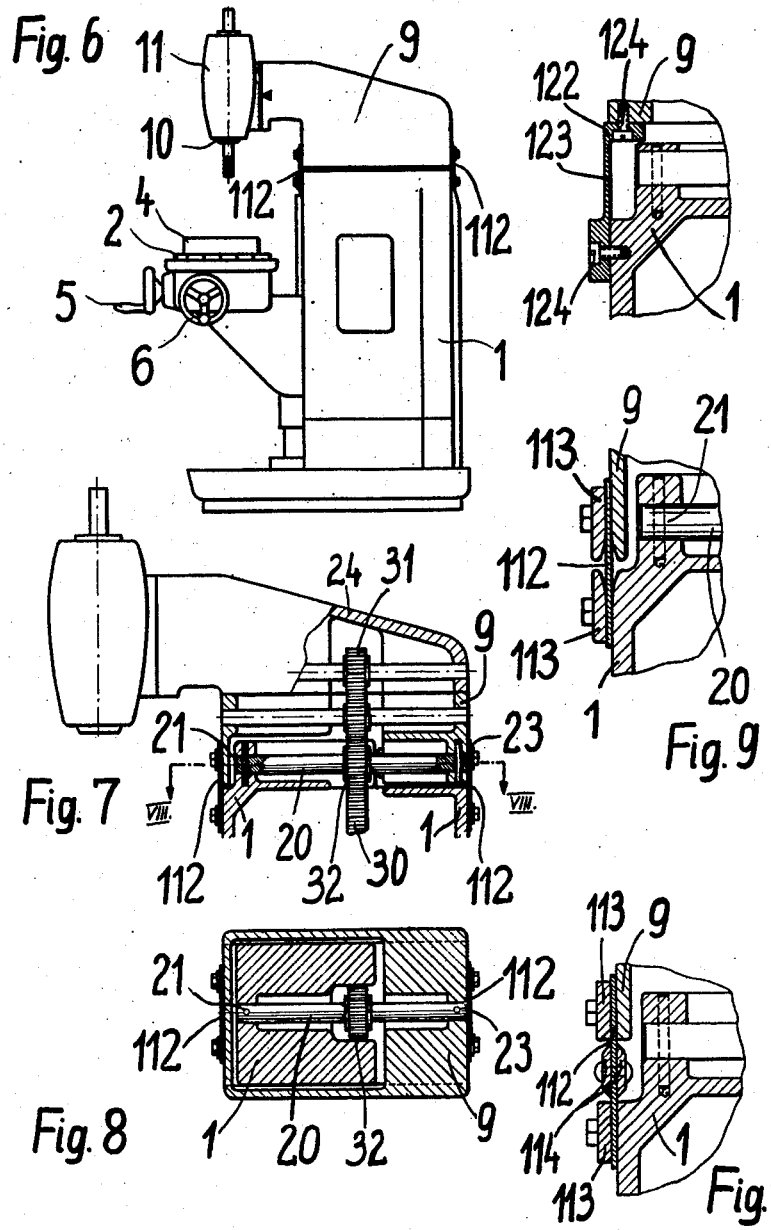

United States Patent Office 2,957,392
Patented Oct. 25, 1960

2,957,392

MACHINE TOOLS

Kurt Zwick and Rudolf Wolfbauer, Munich, Germany, assignors to Hans Deckel, Munich-Solln, Germany, and Friedrich Wilhelm Deckel, Zug, Switzerland Filed Aug. 30, 1956, Ser. No. 607,121

Claims priority, application Germany Sept. 1, 1955

6 Claims. (Cl. 90—11)

This invention relates to machine tools for milling, drilling or boring, or grinding.

In a jig boring machine, for instance, the workpiece is moved together with its support or face plate through preset, accurately distinguishable distances, while the tool or boring head remains in a fixed position. The accuracy attainable with such an arrangement is impaired by the heat expansion that occurs in the machine frame in the operation of the machine and causes the boring head to become displaced relatively to the workpiece. In view of the temperature fluctuations to be expected in normal working, owing to variations in the external temperature and the lost heat generated in the machine, as well as the usual dimensions of such machines, such dimensional changes may attain a value of several microns; i.e. a degree of error which is greater than the required degree of accuracy.

The present invention is intended to remedy this. It provides a machine tool in particular for milling, drilling or boring, or grinding characterized in that the tool holder is movably supported with reference to the work carrier and is linked with the latter by not less than one elongation or expansion bar, said bar and the machine frame being made of materials having different coefficients of thermal expansion, whereby the deformation of the machine structure by heating is compensated between the tool holder and the work carrier by the reciprocal displacement of these parts during their thermal expansion.

By way of example some embodiments will now be described with reference to the accompanying drawings, wherein:

Figure 1 is a diagrammatic elevation of one embodiment;

Fig. 2 represents a fragmentary vertical section of the upper part of the machine of Fig. 2 on line II—II;

Fig. 3 shows another embodiment of the invention with the casing of the machine broken away to show the interior assembly;

Fig. 4 is a horizontal section on line IV—IV of Fig. 3;

Fig. 5 is a fragmentary vertical section on line V—V of Fig. 3;

Fig. 6 shows a further embodiment of the invention;

Fig. 7 shows the details of the form of construction according to Fig. 6;

Fig. 8 is a horizontal sectional view taken on line VIII—VIII of Fig. 7;

Fig. 9 is a fragmentary vertical sectional view showing another form of the invention shown in Fig. 6;

Fig. 10 is a fragmentary vertical sectional view of still another arrangement of the invention shown in Fig. 6; and Fig. 11 is a fragmentary vertical sectional view of a still further modification of the invention shown in Fig. 6.

In accordance with Figs. 1 and 2, the machine comprises a frame 1 which carries on its front side a work table or face plate 2. This work table or face plate enables a workpiece 4 attached thereto to be moved by hand wheels 5 and 6 through exactly measurable distances, e.g. in the two coordinate directions "down" and "sideways." The amount of such displacement is indicated by a measuring or gauging arrangement on the work table.

The upper part of the machine frame 1 carries a spindle head 9 which contains a boring head 10. If necessary, the boring head can be supported in a holder 11 which is rotatable with reference to the spindle head proper.

In accordance with the invention the spindle head 9 is not fixed but is slidable on the machine frame 1 and is held by two extension or expansion bars 12. These bars 12 are fixed by their front ends 13 to the machine frame 1 and by their rear ends 14 to the spindle head 9, each being thus placed longitudinally in the direction towards the work table, i.e., in the direction in which the spindle head projects from the machine frame. The bars 12 are made of a material having a higher coefficient of thermal expansion than the material of the spindle head 9 and the machine frame 1.

An arrangement of this nature eliminates the aforementioned inaccuracies due to heat expansion. It is easily appreciated that when the mass becomes heated, the distance between the boring tool holder 11 in the spindle head 9 and the point of attachment on the machine frame will increase. In an arrangement of the usual kind, the tool would become displaced to the left in Fig. 1 relatively to the workpiece 4 clamped on the machine table 2. However, the extension bars 12 themselves expand longitudinally, and displace the entire spindle head assembly to the right. Since the coefficient of expansion of the material of the bars is greater than that of the spindle head, and the length of the spindle head is greater than that of the extension bars, it is possible, by suitably determining the length of the extension bars and selecting a material with the appropriate coefficient of expansion, to compensate the longitudinal expansion of the spindle head and bending of the machine frame due to heating in service. It is thus possible to ensure that the tool remains rigidly located, in a fixed position relatively to the workpiece thereby practically to eliminate the inaccuracies previously mentioned.

The extension bars 12 are most advantageously made of a material with a higher coefficient of thermal expansion than that of the material of the spindle head and the machine frame.

The main feature of our invention is the provision of means for compensating for the expansion of the head 9 caused by the heating produced by the friction of the driving means located within the head. Our invention permits expansion of parts of the machine under conditions of increase in temperature, and the different parts of the machine tool are arranged in such a manner that the effects, or the consequences, of the thermal expansion of one or more parts of the machine tool with respect to the axis of the spindle are compensated by the effects of the thermal expansion of at least one other part of the machine tool. On a machine tool of the type employed in our invention, inaccurate operation resulting from dislocation of the tool spindle due to an expansion of the spindle head, is avoided by constructing the spindle head as a separate element with respect to the frame of the machine tool, the said spindle head being guided on the machine frame and connected thereto by linking means which compensate the expansion of the spindle head on account of the expansion characteristics thereof when subject to temperature variation.

In the embodiment shown in Figs. 3, 4 and 5 a single extension or expansion bar 20 is held at its front end, by a key 21, in the upper part of the machine frame 1 and at its rear end, by a key 23, in the rear part of the spindle head 9. The spindle head 9 is provided with two pins 25 that slide without clearance in two holes 26 in the machine frame 1 at the sides of the bar 20. Upon expansion of the bar 20, the spindle head moves along the track constituted by these two guides. To prevent skewing of the spindle head, a third guiding means may be provided, preferably in the form of a third pin fitted in the rear part of the spindle head and likewise sliding in a hole in the machine frame.

If required it is also possible (as shown in Fig. 5) to construct the spindle head 9 in such a manner that various appliances, such as a boring head 24 or a grinding head or a milling head can be fitted by means of a dovetail guide 40 into the part 9 of the spindle head. This enables a variety of machining operations to be performed, the extension bar 20 meanwhile ensuring that each tool is held in a fixed position with reference to the workpiece. However, it is essential that for each tool the distance influenced by heat expansion between the tool and the spindle head attachment is adjusted to suit the length of the extension bar.

As a part of the heat causing the distortion is generated in the gears driving the tool head, the extension bar or bars can advantageously be located in the immediate vicinity of such gears in order that the heat generated in the latter and depending on their speed of rotation may be transmitted to the extension bar or bars without any time lag, no avoiding any phase shift in time between the expansion of the spindle head and said bar or bars. This is indicated in Figs. 3 and 4 in which a toothed wheel 32 is shown between the driving wheel 30 in the machine frame 1 and the follower wheel 31 in the spindle head 24, the wheel 32 being mounted on the extension bar 20, for instance in a needle bearing. In the embodiment just described, the tool is carried in a spindle head projecting beyond the machine frame. This spindle head is slidably mounted on the machine frame and retained by means of the extension bar. It is to be understood that the invention is in no way restricted to this form of arrangement, but that the extension bar can equally be disposed at some other point between the workpiece and the tool, provided only that its expansion compensates the distortion by heating of the machine frame between said workpiece and said tool.

As will be clear from the foregoing it is necessary that the parts connected by the extension bar or bars (i. e. in the simplest case the spindle head and the machine frame) shall be capable of a small amount of displacement without any friction disturbing or influencing their reciprocal motion. The arrangements shown in Figs. 6 to 11 constitute forms of particularly simple, robust and frictionless mounting not subject to disturbance in that the structural element to be moved, i.e., the spindle head is held on its support, i.e. the machine frame, preferably by not less than two leaf springs, allowing motion of the spindle head in only one direction, viz. the direction of elastic flexure of the leaf springs.

As shown in Figs. 6 to 8, the spindle head 9 is not slidably mounted on the machine frame 1, as in Figs. 1 to 5, but is attached thereto by means of two leaf springs 112. The manner of attachment of the springs to the machine frame and the spindle head allows the spindle head to move only in the direction of action of the springs; i.e. horizontally to the left and right. Since, as well be seen in Fig. 8, the leaf springs are of appreciable length in the direction perpendicular to the desired direction of deflection, lateral displacement of the spindle head, i.e. in a direction perpendicular to the plane of the drawing in Figs. 6 and 7 is impossible. Thus, the spindle head can only move horizontally in the longitudinal direction of the extension or expansion bar 20, in which it remains practically parallel to its own axis and cannot tilt or slew.

As the spindle head does not itself bear directly on the machine frame, its motion is free from any friction and is determined solely by the elastic deflection of the leaf springs.

The displacement of the spindle head relatively to the machine frame due to the action of the bar 20 is effected by supporting the spindle head on the springs 112 entirely without friction. It has to be considered that the amount of displacement of the spindle head is of the order of magnitude of a few hundredths of a millimeter; in the presence of friction between the spindle head and the machine frame, there is a danger that the displacement of the spindle head due to elongation of the bar 20 will take place abruptly, because the force exerted by the bar must first overcome the friction between the spindle head and the machine frame. Such an irregular and abrupt motion of the spindle head, due to friction, is avoided by the form of mounting last described, as there is now no longer any friction between the spindle head and the machine frame. The spindle head thus follows the elongation of the extension bar, always accurately and uniformly, without any retardation.

Fig. 9 shows another form of the means for attaching the leaf springs to the machine frame, and spindle head, in particular in section corresponding to Fig. 7. The leaf springs 112 thus have a considerable elongation perpendicularly to the plane of the drawing. Two pressure plates 113 hold each leaf spring 112 on the machine frame 1 and on the spindle head 9 respectively and simultaneously determine the length available for free, elastic deflection. At the same time, they distribute the pressure of the holding screws uniformly over the whole surface of the leaf springs. The bearing surfaces on the machine frame 1 and spindle head 9 as well as on the pressure plates 113 are bevelled.

Fig. 10 shows a further form of the means of attaching the springs, in which again the leaf springs 112 are held against the spindle head 9 and machine frame 1 by means of pressure plates 113. In the case of Fig. 10, the free length of the springs 112 between the two pressure plates 113 is somewhat longer than in the case of Fig. 9. At the same time, clamping plates 114 are riveted on either side of the springs 112, in the middle, in such a manner that the leaf springs 112 are free to deflect by only a very small amount. Thus, each of the springs 112 acts as a double or two way hinge joint.

Fig. 11 shows still another arrangement for the springs. In this case, the spindle head 9 and the machine frame 1 are directly connected by connecting means 122 having central milled recesses 123 producing the elastic, spring effect; on their edges the means 122 have holes for attaching screws 124 by which they are connected to the machine frame 1 and spindle head 9.

This feature of the invention is obviously not restricted to the arrangements shown in Figs. 6 to 10. The decisive factor is only that by the use of not less than two elastically deflecting elements acting in one and the same direction, the mounting of the parts to be linked is obtained in such a manner that no sliding friction takes place, and that a displacement is possible in only one direction determined by the direction of elastic deflection of such elements.

While we have described our invention in certain preferred embodiments, we realize that further modifications may be made and we desire that it be understood that no limitations upon our invention are intended other than may be imposed by the scope of the appended claims.

What we claim and desire to secure by Letters Patent of the United States is:

1. A machine tool for performing machining operations upon a work piece, said tool comprising a machine frame, a work holding part, a tool carrying part elongated in one direction and supported from said frame, said tool carrying part being separate from said frame and being capable of limited movement relative to said frame in the direction of elongation of said tool carrying part, a tool spindle carried by said tool carrying part near one end thereof, and spindle drive means located at least partly within said tool carrying part and effective during operation to generate heat tending to raise the temperature of said tool carrying part and thereby to cause thermal expansion thereof in said direction of elongation, characterized by the provision of expansion compensating means for shifting said tool carrying part relative to said frame by an amount substantially sufficient to compensate for variations in the position of said tool spindle relative to said work holding part as caused by thermal elongation of said tool carrying part, said expansion compensating means comprising at least one elongated expansion bar having a coefficient of thermal expansion different from that of said tool carrying part, said expansion bar extending substantially parallel to said direction of elongation of said tool carrying part and being fixed to said frame substantially at the end of said bar closer to said spindle and fixed to said tool carrying part substantially at the end of said bar farther from said spindle.

2. A machine tool for performing machining operations upon a work piece, said tool comprising a machine frame, a work holding part, a tool carrying part elongated in one direction and supported from said frame, said tool carrying part being separate from said frame and being capable of limited movement relative to said frame in the direction of elongation of said tool carrying part, a tool spindle carried by said tool carrying part near one end thereof, and spindle drive means located at least partly within said tool carrying part and effective during operation to generate heat tending to raise the temperature of said tool carrying part and thereby to cause thermal expansion thereof in said direction of elongation, characterized by the provision of expansion compensating means for shifting said tool carrying part relative to said frame by an amount substantially sufficient to compensate for variations in the position of said tool spindle relative to said work holding part as caused by thermal elongation of said tool carrying part, said expansion compensating means comprising at least one elongated expansion bar having a coefficient of thermal expansion substantially greater than that of said tool carrying part, said expansion bar extending substantially parallel to said direction of elongation of said tool carrying part and being fixed to said frame substantially at the end of said bar closer to said spindle and fixed to said tool carrying part substantially at the end of said bar farther from said spindle.

3. A construction as defined in claim 2, in which said expansion bar is located at least mainly within said tool carrying part in position to be directly exposed to heat generated therein.

4. A construction as defined in claim 2, in which said spindle drive means includes a plurality of rotary driving members, and in which said expansion bar constitutes an axle for one of said rotary driving members.

5. A construction as defined in claim 2, in which said tool carrying part is spaced from said frame and is supported therefrom by means which are resilient in the direction of elongation of said expansion bar, so that when said expansion bar expands, said tool carrying part may move relative to said frame by deforming said resilient supporting means and without sliding friction between said tool carrying part and said frame.

6. A construction as defined in claim 5, in which said resilient supporting means are in the form of leaf springs.

References Cited in the file of this patent

UNITED STATES PATENTS

| | | |
|---|---|---|
| 804,947 | Hapgood | Nov. 21, 1905 |
| 2,376,100 | Turrettini | May 15, 1945 |
| 2,643,078 | Brown et al. | June 23, 1953 |
| 2,664,787 | Plimmer | Jan. 5, 1954 |

FOREIGN PATENTS

| | | |
|---|---|---|
| 221,364 | Switzerland | Nov. 16, 1942 |